US009764975B2

(12) United States Patent
Filho

(10) Patent No.: US 9,764,975 B2
(45) Date of Patent: Sep. 19, 2017

(54) BIOLOGICAL FILTRATION SYSTEM FOR REMOVAL OF NITROGEN COMPOUNDS IN AQUATIC ANIMAL BREEDING ENVIRONMENTS, AND ITS IMPLEMENTING DEVICE

(71) Applicant: Helenio de Carvalho Ellery Filho, Aflitos-Recife (BR)

(72) Inventor: Helenio de Carvalho Ellery Filho, Aflitos-Recife (BR)

( * ) Notice: Subject to any disclaimer, the term of this patent is extended or adjusted under 35 U.S.C. 154(b) by 49 days.

(21) Appl. No.: 14/814,957

(22) Filed: Jul. 31, 2015

(65) Prior Publication Data

US 2017/0029303 A1    Feb. 2, 2017

(51) Int. Cl.
| | | |
|---|---|---|
| *A01K 63/04* | (2006.01) | |
| *C02F 3/32* | (2006.01) | |
| *A01K 63/06* | (2006.01) | |
| *C02F 103/20* | (2006.01) | |

(52) U.S. Cl.
CPC ............ *C02F 3/325* (2013.01); *A01K 63/045* (2013.01); *A01K 63/06* (2013.01); *C02F 2103/20* (2013.01); *C02F 2203/006* (2013.01)

(58) Field of Classification Search
CPC .... C02F 3/325; C02F 3/305; C02F 2101/163; C02F 2103/20; C02F 2203/00; A01K 63/045; A01K 63/06
USPC .......... 210/167.22, 602, 615, 616, 617, 150, 210/151; 119/227, 260, 266, 267
See application file for complete search history.

(56) References Cited

U.S. PATENT DOCUMENTS

| | | | | |
|---|---|---|---|---|
| 3,731,090 A | * | 5/1973 | Veloz ........................ | A61L 2/10 119/245 |
| 3,929,101 A | * | 12/1975 | Katz ..................... | A01K 63/045 119/260 |
| 4,267,038 A | * | 5/1981 | Thompson .............. | C02F 3/302 210/151 |
| 5,054,424 A | * | 10/1991 | Sy ........................ | A01K 63/045 119/231 |
| 5,546,289 A | * | 8/1996 | Gordon .................. | A01K 63/06 119/267 |
| 5,647,983 A | * | 7/1997 | Limcaco ................ | A01K 61/00 119/260 |
| 5,670,046 A | * | 9/1997 | Kimmel ................... | C02F 3/04 210/151 |
| 7,025,883 B1 | * | 4/2006 | Olivier ................... | A01K 63/04 210/602 |
| 7,578,933 B1 | * | 8/2009 | Selman .................. | A01K 63/04 119/260 |
| 2003/0081429 A1 | * | 5/2003 | Wong ..................... | A01K 63/06 362/568 |
| 2008/0004181 A1 | * | 1/2008 | Yoshikawa ............ | A01K 63/04 504/150 |

FOREIGN PATENT DOCUMENTS

WO    WO 2016/093445 A1 *  6/2016

* cited by examiner

*Primary Examiner* — Fred Prince
(74) *Attorney, Agent, or Firm* — TraskBritt, P.C.

(57) ABSTRACT

Described is a biological filtration system for removal of nitrogen compounds in an aquatic animal breeding environment such as aquariums and tanks that utilizes a biological filter and an algae filtration stage for removal of nitrate produced by the biological filter. Described is an implementing device and associated methods of making and using the system and device.

7 Claims, 4 Drawing Sheets

BIOLOGICAL FILTRATION SYSTEM FOR REMOVAL OF NITROGEN COMPOUNDS IN AQUATIC ANIMAL BREEDING ENVIRONMENTS, AND ITS IMPLEMENTING DEVICE

TECHNICAL FIELD

The application relates to of a biological filtration system for removal of nitrogen compounds in aquatic animal breeding environments.

BACKGROUND

The conventional biological filtration system widely used in aquatic animal breeding environments is based on the nitrogen cycle to transform two toxic nitrogen compounds (ammonium and nitrite) produced by natural biological processes into nitrate, which is a relatively less toxic nitrogen compound. It consists of media (sponge, ceramic, sand) for fixation of nitrifying bacteria and a circulation system that forces the passage of water through these media. The nitrifying bacteria develop spontaneously in the media and transform the ammonia produced by natural decomposition of the organic material present in the environment water and through the secretions of its inhabitants into nitrite and the latter into nitrate, which accumulates dissolved in water. The nitrate is relatively less harmful to the environment and its inhabitants than ammonia and nitrite, but it must be removed before its concentration becomes critical. The amount of nitrate produced in this process is proportional to the quantities of inhabitants and food provided daily, and their removal is performed through periodic partial water changes. The maintenance of the nitrate concentration at acceptable levels depends on the correct balance between these factors. The cultivation of aquatic plants also aids in the removal of nitrate because these consume it to obtain the nitrogen necessary for their development.

The balance between the quantity of inhabitants, quantity of food and the frequency of partial water changes is commonly neglected, resulting in high concentration of nitrate and causing stress on the inhabitants of the environment and death in case of prolonged exposure. The necessary frequency of the partial water changes for nitrate removal, generally weekly or bimonthly, hinders the environmental maintenance. The appearance of opportunist algae that develop due to excess nitrate compromises the esthetics of the environment as well as hinders its maintenance. The cultivation of aquatic plants as an aid in nitrate control has inherent difficulties that do not justify its use only for this purpose.

BRIEF SUMMARY

Some embodiments of the disclosure include a biological filtration system for removal of nitrogen compounds in aquatic animal environments, the biological filtration system comprising a first portion configured to be disposed on an exterior of an aquatic environment; and a second portion configured to be disposed in an interior of an aquatic environment. The second portion may include at least some media having surfaces for fixation of nitrifying bacteria, the media and nitrifying bacteria forming a biological filter, wherein the surfaces of the at least some media provide for the fixation and development of an algae colony. The algae colony may form an algae filtration stage.

Some embodiments of the disclosure include a biological filtration system for removal of nitrogen compounds in and aquatic animal breeding environment. The biological filtration system may include a biological filter and an algae filtration stage for removal of nitrate produced by the biological filter. The algae filtration stage may include a confined and isolated area through which environment water circulates, wherein the algae filtration stage is subjected to intense light stimulation for the development of an algae colony that consumes the nitrate produced by the biological filter. The biological filtration system may include an internal portion that is configured to be disposed in an interior of the aquatic animal breeding environment, the internal portion supporting the biological filter and the algae colony and an external portion that is configured to be disposed on an exterior of the aquatic animal breeding environment, the external portion supporting a lighting system that provides the light stimulation for the algae colony.

DETAILED DESCRIPTION

Figure 1:
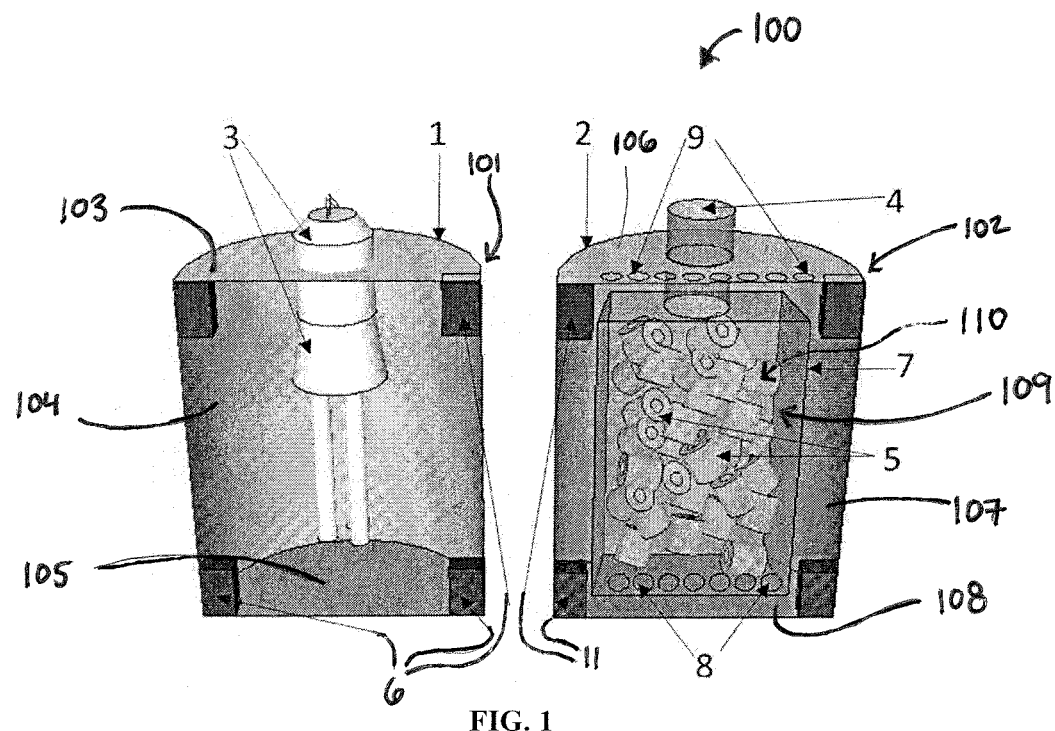
FIG. 1 shows internal views of a first portion and a second portion of a biological filtration system according to an embodiment of the disclosure.

Described is a biological filtration system for removal of nitrogen compounds in aquatic animal breeding environments such as aquariums and tanks, consisting of a biological filter and an algae filtration stage for removal of nitrate produced by the biological filter. Described is an implementing device and related methods of making and using the system and device.

This new biological filtration system was developed to minimize or avoid the problems of conventional filtration systems. Therefore, it is based on the fact that the algae may develop spontaneously in the presence of light and consumes the nitrate necessary for their development. Furthermore, the disclosure provides for the establishment of a confined algae colony in an aquarium under light stimulation (sometimes intense light stimulation) that may consume the nitrate produced by the biological filter. As a result, the algae filtration stage may reduce the problems caused by the accumulation of nitrate and the necessary frequency of partial water changes in the aquarium. The inclusion of the algae filtration stage in the biological filter provides advantages over conventional biological filtration systems.

The device included in the disclosure is specifically implemented in aquariums; however, this is not the only form of implementation. The device provides a simple, efficient, and easy installation into already mounted or new aquariums. The figures listed below and the detailed description of the device will complement the presentation of the invention.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "upper," "lower," "top," "bottom," or an other relational term may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "upper" or "lower" may refer to a view of the biological filtration system mounted to an aquarium that is resting on a flat horizontal surface (e.g., a table surface).

Figure 2:
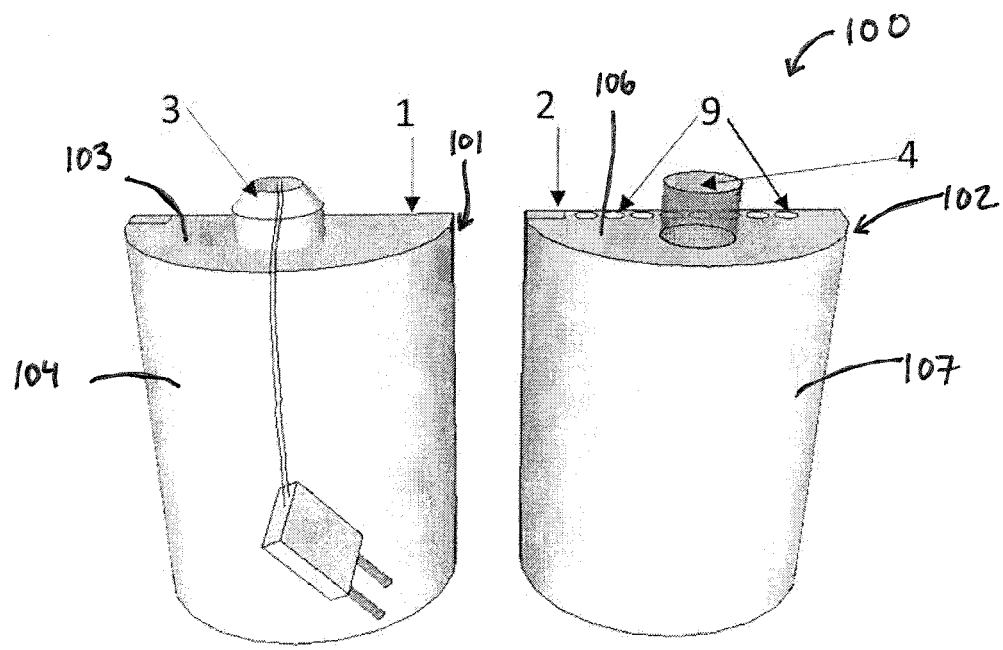
FIG. 2 shows perspective external views of the first and second portions of the biological filtration system of FIG. 1.
Figure 3:
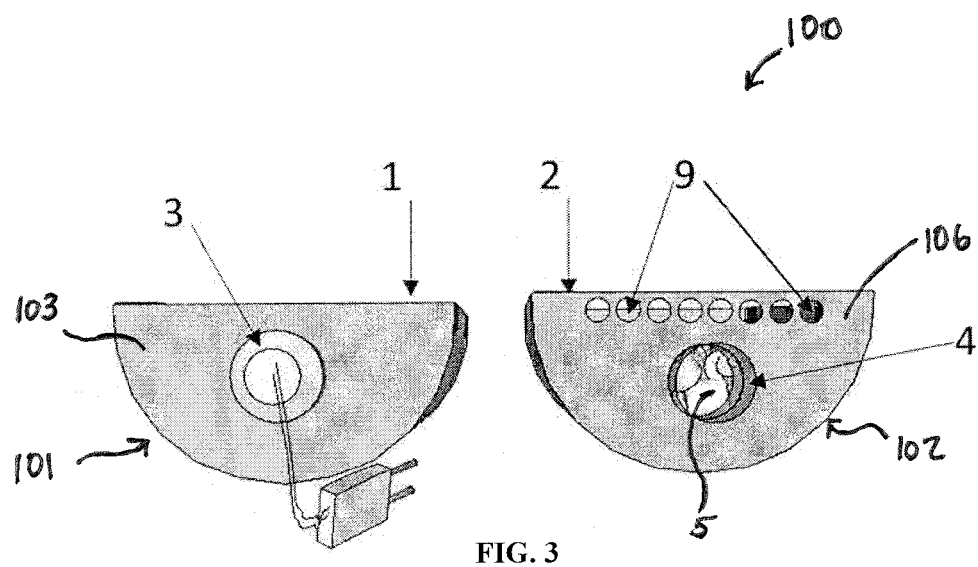
FIG. 3 shows top views of the first and second portions of the biological filtration system of FIG. 1.

FIG. 1 shows internal views of a biological filtration system 100 according to an embodiment of the disclosure. FIG. 2 shows external views of the biological filtration system 100. FIG. 3 shows top external views of the biological filtration system 100. Referring to FIGS. 1, 2, and 3 together, the biological filtration system 100 may include a first portion 1 (i.e., external portion) and a second internal portion 2 (i.e., internal portion).

The first portion 1 may include a first external wall structure 101, a first set of positioning magnets 6, and a lighting system 3. The first external wall structure 101 of the first portion 1 may include a first side wall 104, a first upper wall 103, and a first lower wall 105. The first side wall 104 of the first external wall structure 101 of the first portion 1 may include half of a cylindrical PVC tube. The PVC tubing may have a diameter within the range of 5 to 15 cm. For example, in some embodiments, the PVC tubing may have a diameter of 10 cm. The PVC tubing may have a length within the range of 8 cm to 20 cm. For example, in some embodiments, the PVC tubing may have a length of 13 cm.

In some embodiments, the first set of positioning magnets 6 may include at least four magnets, wherein a magnet of the first set of positioning magnets 6 may be disposed proximate each corner of the first portion 1 of the biological filtration system 100. The lighting system 3 may provide light stimulation for an algae colony that may develop in the second portion 2 of the biological filtration system 100, as described below in further detail. The lighting system 3 may include a plug, wire, interrupter, socket, and lamp. The lamp may be electronic and may have an approximate power of 10 watts. In some embodiments, the lamp may include a white light with approximate color temperature of at least about 6500 Kelvin. In some embodiments, the lamp may include a white light with approximate color temperature of at least about 7000 Kelvin. In some embodiments, the lamp may include a white light with approximate color temperature of at least about 8000 Kelvin. Such color temperatures may maximize stimulation of the algae colony, which may develop in the second portion 2 of the biological filtration system 100, as described below in further detail.

The second portion 2 may include a second external wall structure 102, a second set of positioning magnets 11, a biological filter 109, a transparent plastic bottle 7 and a first plurality of water inlet holes 8, media 5, an algae filtration stage 110, a tube 4 coupled to a water circulation system 10 (FIG. 4), and a second plurality of water inlet holes 9.

The second external wall structure 102 of the second portion 2 may include a second side wall 107, a second upper wall 106, and a second lower wall 108. The second side wall 107 of the second external wall structure 102 of the second portion 2 may include half of a cylindrical PVC tube. The PVC tubing may have a diameter within the range of 5 to 15 cm. For example, in some embodiments, the PVC tubing may have a diameter of 10 cm. The PVC tubing may have a length within the range of 8 cm to 20 cm. For example, in some embodiments, the PVC tubing may have a length of 13 cm. In some embodiments, the first external wall structure 101 and the second external wall structure 102 may have the same diameter.

Figure 4:
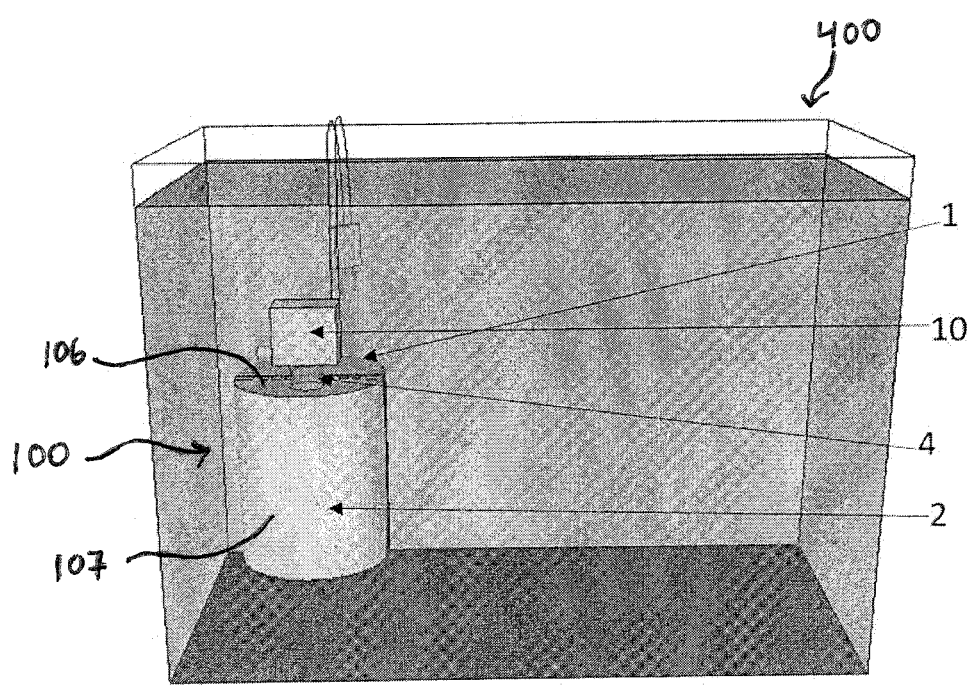
FIG. 4 shows a front perspective view of the biological filtration system of FIG. 1 mounted to an aquarium.

In some embodiments, the second set of positioning magnets 11 may include at least four magnets, wherein a magnet of the second set of positioning magnets 11 may be disposed proximate each corner of the second portion 2 of the biological filtration system 100. The biological filter 109 may include the transparent plastic bottle 7 and the media 5. The transparent plastic bottle 7 may be disposed within an interior of the second external wall structure 102 of the biological filtration system 100. The media 5 may be disposed within an interior of the transparent plastic bottle 7. The first plurality of water inlet holes 8 may extend through a bottom wall of the transparent plastic bottle 7. The second plurality of water inlet holes 9 may extend through a second upper wall 106 of the second external wall structure 102 of the second portion 2 of the biological filtration system 100. The tube 4 may extend from a hole in a top wall of the transparent plastic bottle 7, through the second upper 106 wall of the second external wall structure 102 of the second portion 2 of the biological filtration system 100, and to the water circulation system 10 (FIG. 4). The media 5 may include a plurality of ceramic rings. The plurality of ceramic rings may provide for fixation of nitrifying bacteria onto the ceramic rings. Furthermore, the plurality of ceramic rings may provide surfaces for the fixation and development of the algae colony, which may feed off nitrate produced by the nitrifying bacteria. The algae colony may form at least a portion of the algae filtration stage 110 of the biological filtration system 100. The growth of the algae colony may be stimulated by the light system 3 of the first portion 1 of the biological filtration system 100. The plurality of ceramic rings may be disposed in the transparent plastic bottle 7, which is connected to the tube 4, which is coupled to the water circulation system 10 (FIG. 4).

Figure 5:
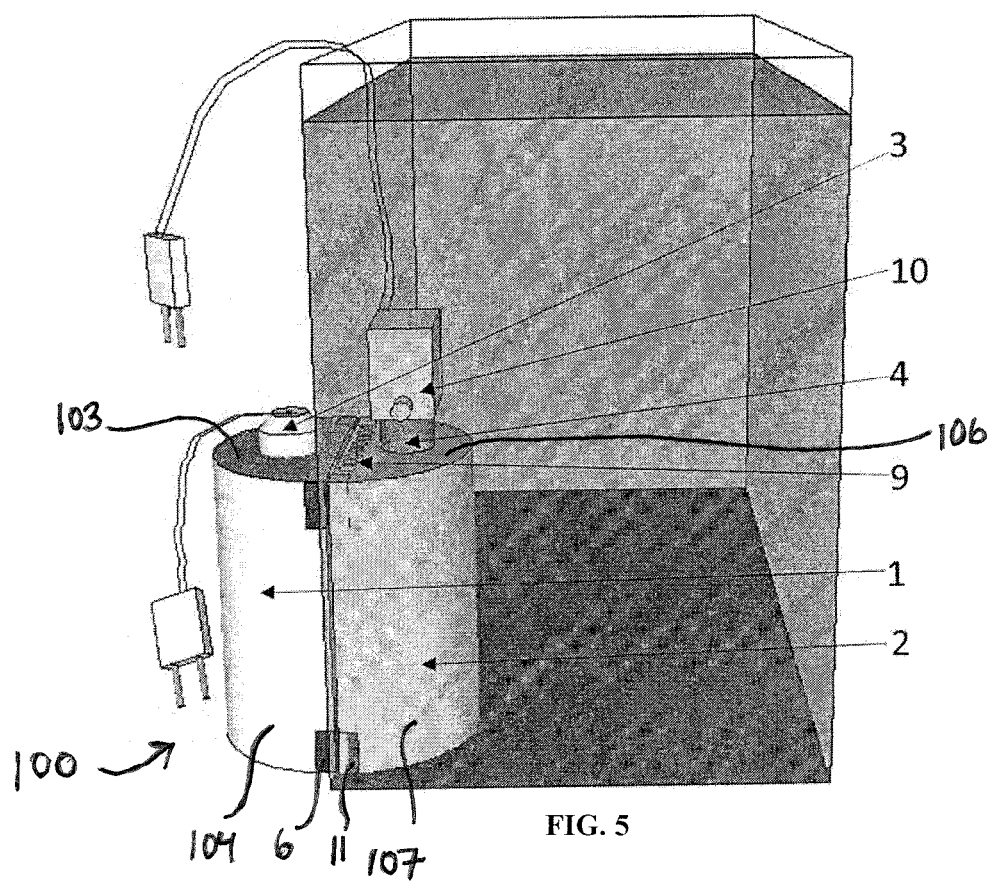
FIG. 5 shows a side perspective view of the biological filtration system of FIG. 1 mounted to an aquarium.
Figure 6:
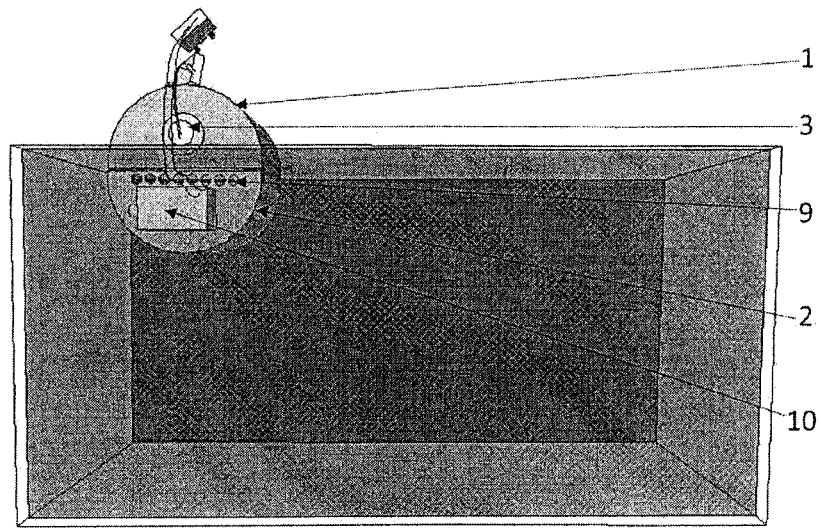
FIG. 6 shows a top perspective view of the biological filtration system of FIG. 1 mounted to an aquarium.

FIG. 4 shows a front perspective view of the biological filtration system 100 of FIG. 1 installed in an aquarium 400. FIG. 5 shows a side perspective view of the biological filtration system 100 of FIG. 1 installed in the aquarium 400. FIG. 6 shows a top perspective view of the biological filtration system 100 of FIG. 1 installed in the aquarium 400. Referring to FIGS. 4, 5, and 6 together, the first portion 1 of the biological filtration system 100 may be installed in a position outside the aquarium 400 and the second portion 2 may be installed in position inside the aquarium 400. As a result, during use, the second portion 2 may be submerged in water. As shown in FIGS. 4, 5, and 6, the first portion 1 and the second portion 2 of the biological filtration system 100 may be aligned on opposite sides of a wall of the aquarium 400 with the first set of positioning magnets 6 (FIG. 1) of the first portion 1 being aligned with the second set of positioning magnets 11 (FIG. 1) of the second portion 2. The first and second sets of positioning magnets 6, 11 (FIG. 1) may hold the first portion 1 and second portion 2 in place relative to one another. The first and second portion 1, 2 of the biological filtration system 100 may be aligned such that the first and second upper walls 103, 106 are coplanar and such that the first and second lower walls 105, 108 are coplanar. Furthermore, the first and second sets of positioning magnets 6, 11 (FIG. 1) may hold the first portion 1 of the biological filtration system 100 as least substantially as close as possible to the second portion 2 given a thickness of the wall of the aquarium 400. Orienting the first and second portions 1, 2 at least substantially as close as possible to each other may as least substantially isolate an interior (e.g., an inside the second portion 2) of the biological filtration system 100 from the rest of the aquarium 400. Furthermore, orienting the first and second portions 1, 2 at least substantially as close as possible to each other may restrict any light stimulation provided by the lighting system 3 of the first portion 1 to the interior of the biological filtration system 100 such that the light provided by the lighting system 3 may not stimulate algae growth within the rest of the aquarium 400. In other words, the orientation of the first portion 1 relative to the second portion 2 may at least substantially prevent the light from escaping the interior of the biological filtration system 100. Moreover, orienting the first and second portions 1, 2 at least substantially as close as possible to each other may maximize an effectiveness of the circulation system 10 of the biological filtration system 100, and as a result, may maximize water circulation inside of the second portion 2.

When the water circulation system 10 of the biological filtration system 100 is activated, a negative pressure may be at least substantially continuously generated and transmitted through the coupling tube 4 and into the transparent plastic bottle 7. The negative pressure may force the entry of water into the biological filtration system 100 through the first and second plurality of holes 8 and 9. Furthermore, the negative pressure may cause water to pass through and over the media 5 and, eventually, return it to the aquarium 400 (e.g., outside of the biological filtration system 100.

Internal biological processes of an aquarium 400 (e.g., activities of inhabitants and feeding inhabitants) produce ammonia. Furthermore, after an initial continuous operating period of the above-described process (e.g., cycling period), bacteria will develop in the media 5 such that the biological filter 109 (FIG. 1) is established. Moreover, the bacteria on the media 5 will begin to produce nitrate.

When the lighting system 3 of the first portion 1 of the biological filtration system 100 is activated, a light stimulation may begin inside (e.g., on the media 5 of) the second portion 2. Due, at least in part, to the light stimulation of the lighting system 3, an algae colony may develop on the media 5 inside the transparent plastic bottle 7 of the second portion 2 of the biological filtration system 100. The algae colony will form the algae filtration stage 110. Furthermore, considering that there is nitrate production by the biological filter 109 (e.g., nitrifying bacteria), the algae colony (e.g., algae filtration stage 110) will become established inside the second portion 2 of the biological filtration system 100 and the algae colony will consume the nitrate. Therefore, the algae colony (e.g., algae filtration stage 110) will filter at least a portion of the nitrate out of the water of the aquarium 400. Thus, the algae colony produced on the media 5 5 inside the transparent plastic bottle 7 of the second portion 2 of the biological filtration system 100 may complement the operation of the biological filter 109.

After being apprised of the disclosure, one of ordinary skill in the area will be able to make the system with commercially available parts.

What is claimed is:

1. A biological filtration system for removal of nitrogen compounds in aquatic animal environments, the biological filtration system comprising:
   a first portion configured to be disposed on an exterior of an aquatic environment, wherein the first portion comprises:
      a first external wall structure having a first side wall, first upper wall, and first lower wall; and
      a light system disposed in an interior of the first external wall structure of the first portion;
   a second portion configured to be disposed in an interior of an aquatic environment, the second portion comprising:
      at least some media having surfaces for fixation of nitrifying bacteria, the media and nitrifying bacteria forming a biological filter, wherein the surfaces of the at least some media provide for the fixation and development of an algae colony;
      a second external wall structure having a second side wall, second upper wall, and second lower wall; and
      a transparent bottle disposed within the second external wall structure, wherein the media is disposed within the transparent bottle.

2. The biological filtration system of claim 1, wherein the first side wall of the first external wall structure comprise a half of a cylindrical tube.

3. The biological filtration system of claim 1, wherein the light system of the first portion is configured to stimulate a growth of the algae colony in the second portion of the biological filtration system.

4. The biological filtration system of claim 1, wherein the light system produces light having a color temperature within a range of 6500 Kelvin to 8000 Kelvin.

5. The biological filtration system claim 1, further comprising: a first plurality of water inlet holes extending through a bottom wall of the transparent bottle of the second portion; a second plurality of water inlet holes extending through the second upper wall of the second external wall structure of the second portion; and a tube extending from a top wall of the transparent bottle and through the second upper wall of the second external wall structure of the second portion.

6. The biological filtration system of claim 1, wherein the algae colony forms an algae filtration stage.

7. A biological filtration system for removal of nitrogen compounds in an aquatic animal breeding environment, wherein the biological filtration system comprises:
   a biological filter;
   an algae filtration stage for removal of nitrate produced by the biological filter, wherein the algae filtration stage comprises a confined and isolated area through which environment water circulates, wherein the algae filtration stage is subjected to light stimulation for the development of an algae colony that consumes the nitrate produced by the biological filter;
   an internal portion that is configured to be disposed in an interior of the aquatic animal breeding environment, the internal portion supporting the biological filter and the algae colony, the interior portion comprising a first external wall structure having a first side wall, a first upper wall, and a first lower wall, and a transparent bottle disposed within the first external wall structure, wherein media having surfaces for fixation of nitrifying bacteria and for fixation and development of the algae colony; and an external portion that is configured to be disposed on an exterior of the aquatic animal breeding environment, the external portion supporting a lighting system that provides the light stimulation for the algae colony, the external portion comprising a second external wall structure having a second side wall, a second upper wall, and a second lower wall, and a light system disposed in an interior of the second external wall structure of the external portion.

* * * * *

UNITED STATES PATENT AND TRADEMARK OFFICE
CERTIFICATE OF CORRECTION

| | |
|---|---|
| PATENT NO. | : 9,764,975 B2 |
| APPLICATION NO. | : 14/814957 |
| DATED | : September 19, 2017 |
| INVENTOR(S) | : Helenio de Carvalho Ellery Filho |

It is certified that error appears in the above-identified patent and that said Letters Patent is hereby corrected as shown below:

In the Claims

Claim 5, Column 6, Line 36, change "filtration system claim" to --filtration system of claim--

Signed and Sealed this
Fifth Day of June, 2018

Andrei Iancu
*Director of the United States Patent and Trademark Office*